3,590,057
[α-($C_5$-$C_{17}$)ALKYL]BENZYL FATTY ACID AMIDES AS CHOLESTEROL LOWERING AGENTS
Yoshio Suzuki, Amagasaki-shi, Yasushi Nakamura, Ibaragi-shi, Toshitsugu Fukumaru, Kyoto, Noritaka Hamma, Nishinomiya-shi, Michio Kimura, Minoo-shi, Shunji Aono, Toyonaka-shi, and Hideaki Fukushima, Nishinomiya-shi, Japan, assignors to Sumitomo Chemical Company, Ltd., Osaka, Japan
No Drawing. Filed Dec. 3, 1968, Ser. No. 7880,876
Claims priority, application Japan, Dec. 21, 1967, 42/82,279
Int. Cl. C09f 7/00
U.S. Cl. 260—404                                    15 Claims

ABSTRACT OF THE DISCLOSURE

A novel fatty acid amide having action to lower cholesterol in the blood which is composed of an α-alkylbenzylamine containing in the α-position an alkyl group having 5–17 carbon atoms and a monocarboxylic acid containing a saturated or unsaturated hydrocarbon group having 15–19 carbon atoms. The fatty acid amide is prepared by reacting said monocarboxylic acid, a reactive derivative thereof or natural fat with said α-alkylbenzylamine.

---

This invention relates to cholesterol-lowering agents. More particularly, the invention pertains to agents which are useful for the lowering of elevated levels of cholesterol in the blood.

Atherosclerosis is an adult disease for which there is no known satisfactory cure. Although the cause for atherosclerosis is not yet known in spite of discussions in the academic circles, it has broadly been recognized that one of the most significant histopathological manifestations of atherosclerosis is the deposition of lipids in the blood. Accordingly, research has been directed to the disturbed metabolism of lipids, and attenuation has been given to the extraordinarily elevated level of cholesterol in the blood.

A number of experimental and clinical facts have been reported, which indicate the relationship between atherosclerosis and elevated blood cholesterol level. Hence, the development of agents to reduce the elevated blood cholesterol level is extremely important for the prevention of atherosclerosis.

Concentrated efforts have heretofore been made for the development of such agents for lowering cholesterol, and a number of compounds have been tested clinically, but none of them have been proved to be completely satisfactory. Some of them are fairly effective but produce harmful side effects which are not negligible, and others have inadequate effectiveness, so that they are required to be administered in large doses.

A group of compounds practically employed nowadays for the above purpose comprises unsaturated fatty acids, especially linoleic acid. The reason why linoleic acid is employed is because of its harmlessness to the human body. However, its effectiveness is not very high, and is uncertain and indefinite. Accordingly, large doses are required to obtain at least appreciable efficacy as a cholesterol-lowering agent.

The present inventors have found a group of compounds which are effective as cholesterol-lowering agents and are substantially nontoxic.

It is therefore an object of the present invention to provide cholesterol-lowering agents.

Another object is to provide a process for preparing cholesterol-lowering agents.

A further object is to provide pharmaceutical compositions containing such agents.

Other objects will be apparent from the following description.

In order to accomplish the above objects, the present invention provides fatty acid amides represented by the formula,

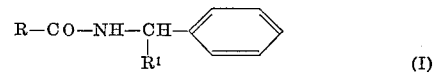

(I)

wherein R is a saturated or unsaturated aliphatic hydrocarbon group having 15 to 19 carbon atoms; and $R^1$ is an alkyl group having 5 to 17 carbon atoms. These fatty acid amides (I) are novel compounds, and are prepared by reacting a fatty acid represented by the formula,

(II)

wherein R is as defined above, its reactive derivative or natural fat, with an amine represented by the formula,

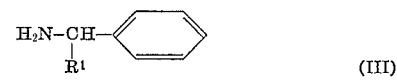

(III)

wherein $R^1$ is as defined above.

The fatty acids of the Formula II and their reactive derivatives, which are used in the present invention, are as follows:

Examples of the saturated fatty acids include palmitic, stearic, isostearic, and the like acids. Example of the unsaturated fatty acids include oleic, linoleic, linolenic, γ-linolenic, arachidonic, and the like acids. Examples of the reactive derivatives, include acid halides, acid anhydrides, mixed acid anhydrides with lower fatty acids, mixed acid anhydrides with lower alkyl formate, lower alkyl esters, and glycerides, including natural oils and fats, of the above-mentioned saturated and unsaturated fatty acids.

Examples of the natural oils and fats include hemp-seed oil, linseed oil, styrax oil, oiticica oil, kaya oil, walnut oil, poppy seed oil, safflower oil, water melon-seed oil, soybean oil, sunflower oil, rice bran oil, sesame oil, corn oil, rape-seed oil, cotton-seed oil, olive oil, castor oil, peanut oil, palm oil, tsubaki oil, coconut oil, beef tallow, lard, horse fat, chrysalis oil, shark oil, cuttlefish oil, sardine oil, mackerel oil, saury oil, whale oil and the like.

The amine of the Formula III, which is used in the present invention, is obtainable according to an ordinary process such as a process carried out by subjecting an α-halogenoalkylbenzene to amination or by subjecting a fatty acid halide and benzene to formation of an alkylbenzophenone by Friedel-Crafts' reaction and then converting said alkylbenzophenone to amine by Leuckart method as disclosed in the Journal of Organic Chemistry, vol. 9, page 529 (1944). Further, the optical resolution of said amine can be accomplished according to an ordinary procedure using tartaric acid or the like.

In accordance with the present process, the desired fatty acid amides can be obtained with advantages by the following reaction procedures:

(1) Reaction of a fatty acid with an amine in the presence or absence of a dehydrating agent to remove water, (2) Reaction of a fatty acid ester or glyceride with an amine in the presence or absence of a catalyst to remove alcohol, (3) Reaction of a fatty acid halide with an amine, or (4) Reaction of an acid anhydride or a mixed acid anhydride with an amine.

The above-mentioned reaction procedures will be successively explained in further detail below.

(1) Reaction of the fatty acid with the amine: In this reaction, the two compounds are used in equimolar amounts, or either one of them is used in excess. In the case of the absence of dehydrating agent, a solvent such as toluene or xylene may be used, if necessary. Ordinarily, the reaction is carried out at 100°–300° C. in the absence of solvent, while removing or not removing eliminated water. The reaction is usually completed in several hours to several ten hours. The starting material used in excess is recovered and is reused in the reaction, whereby the desired fatty acid amide can be synthesized economically.

In the case of the presence of a dehydrating agent, the two compounds are used in equimolar amounts or either one of them is used in excess, and the two are dissolved in a suitable solvent, e.g. benzene, toluene, xylene, carbon tetrachloride or the like. To this solution is added a dehydrating agent selected from the group consisting of sulfuric acid, potassium hydrogen sulfate, phenolsulfonic acid, p-toluenesulfonic acid, p-toluenesulfonic acid chloride, and acidic and basic ion exchange resins, e.g. Amberlite IRA–400, IR–50 and IR–120, and Amberlyst 15, 21, 26 and 27 (all these are trade names of ion exchange resins produced by Rohm & Haas Co.). Subsequently, the mixture is refluxed for 10 to 20 hours while removing water formed during the reaction using a water-separator if necessary. Thereafter, the dehydrating agent is removed, and then the solvent and unreacted materials are recovered, whereby a desired fatty acid amide can be obtained economically. When a di-substituted carbodiimide is used as a dehydrating agent, the reaction can be terminated in a short period of time at a low temperature. Examples of such di-substituted carbodiimides include diphenylcarbodiimide, diisopropylcarbodiimide, dicyclohexylcarbodiimide and the like. Of these, however, dicyclohexylcarbodiimide is most frequently employed. In this case, said fatty acid, said amine and the di-substituted carbodiimide are dissolved in an inert solvent respectively, for example, ether, dioxane, tetrahydrofuran, petroleum ether, ligroin, kerosine, n-hexane, cyclohexane, benzene, toluene, xylene, dichloromethane, dichloroethane, chloroform or carbon tetrachloride, and then three solutions are mixed together with vigorous stirring at room temperature or below, whereby the reaction is substantially complete in several minutes. Ordinarily, however, the mixture is allowed to stand at room temperature for several hours and then the formed di-substituted urea is separated by filtration. The desired amide can be easily obtained in a high yield. The separated di-substituted urea is again converted to the di-substituted carbodiimide and is re-usable.

(2) Reaction of a lower alkyl ester of the fatty acid, or a glyceride containing said fatty acid, with the amine (the lower alkyl ester referred to in the above is an ester containing an alkyl group having 1 to 5 carbon atoms: The two compounds are used in equimolar amounts or either one of them is used in excess. A mixture of them is heated at 100°–250° C. while removing the eliminated alcohol as much as possible, whereby the reaction is terminated in a period of several ten hours to one hundred and several ten hours. If necessary, a solvent such as toluene or xylene may be used in the above reaction, but no solvent is necessary in most cases. The reaction time can be shortened by using a catalytic amount of an alkaline condensing agent such as lithium, sodium or potassium metal, sodium methylate, sodium ethylate, caustic soda, caustic potash, sodium carbonate or potassium carbonate, or an acidic condensing agent such as sodium hydrogen sulfate or boric acid as a catalyst.

(3) Reaction of a fatty acid halide with the amine: This reaction is carried out in the following manner:

The amine is dispersed in water or in an aqueous mixed solvent comprising water and acetone, dioxane or tetrahydrofuran. To the resulting dispersion, the fatty acid halide is gradually added at 0°–30° C. in the presence of an alkali such as caustic soda, caustic potash, sodium carbonate, potassium carbonate or sodium hydrogen carbonate, whereby a desired amide of the present invention can be obtained. Alternatively, the amine is dissolved in an inert organic solvent, such as acetone, methylethylketone, methylisobutylketone, ether, dioxane, tetrahydrofuran, petroleum ether, ligroin, kerosine, benzene, toluene, xylene, chloroform or carbon tetrachloride, in the presence of a basic substance such as sodium carbonate, potassium carbonate, caustic soda, caustic potash, or tertially amine such as trimethylamine, triethylamine, dimethylaniline, diethylaniline, pyridine or lutidine, and the solution is gradually charged with the fatty acid halide at 0°–20° C. and, if necessary, the reaction mixture is then heated, whereby the desired amide of the present invention can be obtained in an extremely high yield.

(4) Reaction of an anhydride of the fatty acid with the amine: The acid anhydride employed in this reaction is a compound represented by the formula,

wherein R is as defined previously and $R^2$ is identical with R or is an alkyl or alkoxy group having 1–4 carbon atoms.

The reaction is carried out in such a manner that a solution of the acid anhydride in an inert solvent is gradually added at 0°–100° C. to the amine or to a solution thereof in an inert solvent and, if necessary, the mixture may be heated to complete the reaction. The fatty acid formed in the reaction and unreacted fatty acid anhydride can be recovered to reuse, if necessary. In the case of a mixed acid anhydride of fatty acid and lower alkyl formate which is obtained by reacting a fatty acid of the Formula II with, for example, ethyl chloroformate, the reaction can be terminated extremely quickly and at a low temperature. Such mixed acid anhydride is frequently used for the synthesis of peptides and can be prepared according to, for example, the method disclosed in the Journal of American Chemical Society, vol. 74, page 676 (1952).

The usable solvent in the above reaction is toluene, xylene, n-hexane, cyclohexane, petroleum ether, ligroin, kerosine, ether, dioxane, tetrahydrofuran, acetone, methylethylketone, methylisobutylketone, chloroform or carbon tetrachloride. The reaction is completed in a period of 20–30 minutes to 2 hours by mixing an organic solvent solution of the mixed acid anhydride with the amine at a temperature within the range of from −20° to 20° C. Ordinarily, however, the mixture is allowed to stand over night at room temperature to complete the reaction, whereby the desired fatty acid amide of the present invention can be easily obtained.

In the same manner as in the above-mentioned processes, the employment of optically active amines represented by the Formula III gaves optically active fatty acid amides represented by the Formula I.

The fatty acid amides of the present invention have excellent cholesterol-lowering effects, as is clear from the following experimental example showing a comparison in cholesterol-lower action between known cholesterol-lowering agents and some of the compounds of the present invention. However, the compounds of the present invention are not limited to them.

EXPERIMENTAL EXAMPLE

Compounds of the present invention and known cholesterol-lowering agents were individually incorporated in given amounts into foodstuffs each containing 1% of cholesterol and 0.5% of bile acid salt. Using the above feed stuffs, mice were reared for 10 days. On the 11th day, the amounts of serum and liver cholesterol were measured. The total amount of the serum and liver cholesterol per 100 g. of the body weight of each mouse (cholesterol pool value) was calculated, and the variation (percent) in cholesterol pool value was calcuated according to the following equation:

$$\text{Variation (percent)} = \left(1 - \frac{\text{Value of treated group}}{\text{Value of control group}}\right) \times 100$$

The cholesterol pool variations of the test compounds were as shown in Table 1, and all of the present compounds showed far more prominent cholesterol-lowering effects than in the case of the known compounds, β-sitosterol and linoleic acid, despite the fact that they were used in smaller amounts.

The intake amount of the active ingredient (acid amide) in the foodstuff is preferably about 10 g. per day at the maximum.

In admixing or compounding the said amides, there may be added without prejudicially influencing the accomplishment of the present invention other commonly-used additives such as natural or synthetic emulsifying agents for foods (e.g. lecithin, sorbitan, sucrose esters, fatty acid monoglycerides), antioxidants for foods (e.g. BHT, BHA (butylated hydroxyanisole), tocopherols, propyl gallate, nordihydroguaiaratic acid), coloring agents, flavors, seasonings and water.

TABLE 1.—CHOLESTEROL POOL VARIATIONS OF TEST COMPOUNDS

| Test compounds | Structural formula | Concentration in foodstuff (wt. percent) | Variation (percent) |
|---|---|---|---|
| Present compounds | Iso-$C_{17}H_{35}CONHCH$—⟨⟩ \| $C_5H_{11}$ | 0.05 | −40 |
| | $C_{17}H_{31}CONHCH$—⟨⟩ \| $C_5H_{11}$ | 0.0125 | −20 |
| | $C_{17}H_{29}CONHCH$—⟨⟩ \| $C_7H_{15}$ | 0.0125 | −22 |
| | $C_{17}H_{31}CONHCH$—⟨⟩ \| $C_9H_{19}$ | 0.05<br>0.012 | −33<br>−18 |
| | $C_{17}H_{33}CONHCH$—⟨⟩ \| $C_5H_{11}$ | 0.05 | −32 |
| | Safflower-$CONHCH$—⟨⟩ \| $C_{13}H_{27}$ | 0.05 | −28 |
| | γ-$C_{17}H_{29}CONHCH$—⟨⟩ \| $C_{15}H_{11}$ | 0.0125 | −20 |
| Known cholesterol-lowering agents. | β-sistosterol | 1.0 | +20 |
| | Linoleic acid | 1.0 | +10 |

In actual application of the fatty acid amides of the present invention for lowering cholesterol level in the blood, the compounds are orally administered in a dose about 0.1–10 g./day. Ordinarily, pharmaceutically acceptable inert carriers may be used.

Alternatively, the fatty acid amides may be incorporated into foodstuffs to give enriched foodstuffs.

Foods into which the said amides may be incorporated in line with the object of the present invention are as follows: dairy products such as butter, margarine, cheese, cream, ice cream, skim milk, dry milk and milk; animal and vegetable edible oils such as frying oils, salad oils, mayonnaise and lard; cereal and related foods such as vermicelli, bread, crackers, biscuits, wheat floor, starch, rice, rice flour, dough, buckwheat flour and miso (Japanese bean paste); confectioneries such as caramels, chocolate, chewing gum, wheat-glutens and candies; processed meat and fish such as ham, sausages and pasty products; and other various foods.

Because of their low toxicity, the aforesaid higher unsaturated fatty acid amides can be admixed with the said foods in an extremely wide range of proportion and should be appropriately used depending on the amount and the frequency of intake of the food to be employed. For example, cream or the like, the intake of which is usually small may contain a higher percentage of the said amides, whereas wheat flour, rice flour or the like, the intake of which is rather large may contain a lower percentage of the said amides. Generally, the range varies from about 0.1% to about 80% by weight of the enriched foodstuff.

For example, in applying the present invention to margarine, fats such as beef tallow, lard and a hardened oil (e.g. hardened corn oil) are admixed with oils such as soybean oil, peanut oil, cotton seed oil and safflower oil in a compounding machine so as to prepare a product of suitable melting point and, to the resulting mixture, there is added an appropriate amount of the above-mentioned amides according to necessity and the object in view, a coloring agent, aqueous sodium chloride solution, an emulsifying agent, an antioxidant and the like. Then, the resultant mixture is vigorously agitated in an emulsifier at a temperature a little higher than the melting point and rapidly chilled in a chilling machine to obtain enriched margarine.

Since the higher fatty acid amides used in the present invention are extremely soluble in fats, the said amides can be admixed with edible oils and the like by simply agitating the mixture in a compounding machine, if necessary, with slight warming.

Addition to powdered foods such as wheat flour and rice flour may be practiced by mixing the foods and the said amides in a mill or a compounding machine. If necessary, the amides may be added in the form of a solution in an inert organic solvent such as ethyl alcohol or a vegetable oil.

Enriched bread, enriched wheat vermicelli, enriched crackers, enriched biscuits, enriched instant Chinese vermicelli and the like may be prepared by per se conventional procedures using wheat flour, buckwheat flour or the like previously admixed with the said amides.

According to the present invention enriched rice and the like can be prepared by admixing rice and the like coated with the said amides with untreated rice or by mixing the particles made of the said amides, wheat flour, cellulose acetate, gum arabic, rice powder and the like with untreated rice.

Since the higher unsaturated fatty acid amides are tasteless and odorless, the enriched foods disclosed above have the same taste as the original foods; if anything, the amides rather add smooth feeling to the tongue to improve the appetite. Moreover, the said amide derivatives are of high decomposing temperature, do not decompose at the usual frying-temperatures and are not hydrolyzed with acids and alkalis thus liberating no free amines.

The present invention will be illustrated in further detail below with reference to examples, but the examples do not limit the scope of the invention.

Example 1

A mixture of 14 g. of linoleic acid and 15 g. of α-nonylbenzylamine is heated at 150° C. for 50 hours in a nitrogen atmosphere while removing water from the reaction system. After completion of the reaction, the reaction product is dissolved in ether, and the solution is washed with dilute hydrochloric acid, water, an aqueous sodium bicarbonate solution and water. The ether layer is dried over Glauber's salt. Thereafter, the ether is completely removed by distillation to obtain 20.3 g. of a desired linoleoyl-α-nonylbenzylamide in the form of an oil, $N_D^{21}$ 1.4940, yield 82%.

*Elementary analysis.*—Calculated (percent): C, 82.36; H, 11.59; N, 2.83. Found (percent): C, 82.59; H, 11.74; N, 2.44.

Examples 2–6

In the same manner as in Example 1, various fatty acid amides were synthesized under the conditions set forth in Table 2. The results were as shown in Table 2.

Example 7

A mixture of 2.2 g. of linolenic acid, 2.1 g. of α-heptylbenzylamine, 0.1 g. of p-toluenesulfonic acid and 50 ml. of xylene is refluxed for 35 hours using water separator. The toluene layer was charged with 30 ml. of ether and the organic layer is washed with dilute hydrochloric acid, water, an aqueous sodium carbonate solution and water and dried over Glauber's salt. After removing the solvent by distillation, the residue is distilled under reduficed pressure to obtain 3.6 g. of the desired linolenoyl-α-heptylbenzylamide, B.P. 201–205° C./0.08 mm. Hg, $N_D^{26}$ 1.5029, yield 86%.

*Elementary analysis.*—Calculated (percent): C, 82.52; H, 11.04; N, 3.01. Found (percent): C, 82.41; H, 11.70; N, 3.00.

Example 8

To a solution of 2.8 g. of linoleic acid in 50 ml. of ether, is added a mixture of 3.5 g. of α-heptadecylbenzylamine and a solution of 2.4 g. of dicyclohexylcarbodiimide in 25 ml. of ether under stirring at 0° C. After stirring at 0° C. for 20 minutes, the mixture is allowed to stand overnight at room temperature and 0.5 ml. of glacial acetic acid is added to the reaction mixture. After 1 hour, precipitates are removed by filtration. The filtrate is washed iwth dilute hydrochloric acid, water, an aqueous sodium carbonate solution and water and then the solvent is removed by distillation. Subsequently, crystals are recrystallized from 95% ethanol to obtain 3.7 g. of the desired linoleoyl-α-heptadecylbenzylamide, M.P. 49–50° C., yield 62%.

*Elementary analysis.*—Calculated (percent): C, 82.96; H, 12.10; N, 2.30. Found (percent): C, 82.62; H, 11.89; N, 2.29.

Example 9

A mixture of 13 g. of methyl oleate ester and 11 g. of α-pentylbenzylamine is heated at 170° C. for 40 hours while removing methyl alcohol from the reaction system. After cooling, the reaction mixture is dissolved in 100 ml. of benzene and the solution is washed with dilute hydrochloric acid, an aqueous sodium carbonate solution and water and then dried over Glauber's salt. The solvent is removed by distillation, and the residue is distilled under reduced pressure to obtain 19.2 g. of the desired oleoyl-α-pentylbenzylamide, B.P. 198–204° C./0.04 mm. Hg, yield 84%.

*Elementary analysis.*—Calculated (percent): C, 81.57; H, 11.64; N, 3.17. Found (percent): C, 81.36; H, 11.78; N, 3.05.

Example 10

A mixture of 20 g. of safflower oil and 30 g. of α-tridecylbenzylamine is heated at 150° C. for 60 hours in a nitrogen atmosphere. After cooling, the reaction mixture is dissolved in 150 ml. of ether and the ether solution is washed with dilute hydrochloric acid, water aqueous sodium carbonate solution and water and dried over Glauber's salt. Thereafter, the solvent was completely removed by distillation to obtain 29.7 g. of a semi-solid mass.

The elementary analysis of the thus obtained semi-solid mass showed the values of C, 83.02%; H, 12.15% and N, 2.29%, and the infrared absorption spectrum thereof showed the absorption of —NH— at 3210 cm.⁻¹ and the absorption of —CON< at 1630 cm.⁻¹. From the above,

TABLE 2

| Ex. | Fatty acid | NH₂—CH—⟨C₆H₅⟩ R¹ | Reaction time (hr.) | Reaction temp. (°C.) | Yield (percent) | Behavior | Calculated C | Calculated H | Calculated N | Found C | Found H | Found N |
|---|---|---|---|---|---|---|---|---|---|---|---|---|
| 2 | Isostearic acid | R¹=C₉H₁₉ | 55 | 160 | 83 | B.P. 200–210° C./0.02 mm. Hg. | 81.20 | 12.04 | 3.16 | 81.39 | 12.07 | 3.09 |
| 3 | Linolenic acid | R¹=C₁₅H₃₁ | 40 | 140 | 79 | $N_D^{24}$ 1.5017 | 83.12 | 11.69 | 2.42 | 83.09 | 12.00 | 2.46 |
| 4 | Arachidonic acid | R¹=C₁₀H₂₁ | 58 | 140 | 74 | $N_D^{27}$ 1.5080 | 83.24 | 11.14 | 2.62 | 83.40 | 11.58 | 2.51 |
| 5 | Linoleic acid | R¹=C₅H₁₁ (d−) | 55 | 145 | 85 | B.P. 201–212° C./0.02 mm. Hg. | 81.94 | 11.23 | 3.19 | 82.08 | 11.40 | 3.06 |
| 6 | do | R¹=C₅H₁₁ (l−) | 55 | 145 | 86 | B.P. 201–210° C./0.02 mm. Hg. | 81.94 | 11.23 | 3.19 | 82.11 | 11.09 | 3.11 | it was confirmed that said semi-solid mass was the desired fatty acid amide.

Example 11

A mixture of 20 g. of linseed oil and 31 g. of α-heptadecylbenzylamine is heated at 140° C. for 75 hours in a nitrogen atmosphere. Thereafter, the reaction mixture is treated in the same manner as in Example 8 to obtain 28.2 g. of a semi-solid mass.

The elementary analysis of the thus obtained semi-solid mass showed the values of C, 82.60%; H, 11.89% and N, 2.41%, and the infrared absorption spectrum thereof showed the absorption of —NH— at 3210 cm.⁻¹ and the absorption of —CON< at 1630 cm.⁻¹. From the above, it was confirmed that said semi-solid mass was the desired fatty acid amide.

Example 12

A mixture of 15 g. of methyl isostearate, 14 g. of α-pentylbenzylamine, 0.5 g. of sodium ethylate and 50 ml. of toluene is refluxed for 15 hours. The reaction mixture is washed with dilute hydrochloric acid, water, an aqueous sodium carbonate solution and water and dried over Glauber's salt. Thereafter, the solvent is completely removed by distillation and then the residue is distilled under reduced pressure to obtain 18.1 g. of the desired isostearoyl - α - pentylbenzylamide, B.P. 195–199° C./0.01 mm. mg, yield 82%.

Elementary analysis.—Calculated (percent): C, 81.20; H, 12.04; N, 3.16. Found (percent): C, 81.07; H, 12.00; N, 2.98.

Example 13

A mixture of 14 g. of oleic anhydride and 15 g. of α-nonanylbenzylamine is gradually heated under stirring. At 120° C., the mixture is stirred for 3 hours. The reaction product is dissolved in 100 ml. of benzene, and the solution is washed with dilute hydrochloric acid, water, an aqueous sodium carbonate solution and water and then dried over Glauber's salt, and is chromatographed on alumina using a benzene-chloroform system to obtain 9.1 g. of the desired oleoyl-α-nonanylbenzylamide $N_D^{27}$ 1.4982, yield 73%.

Elementary analysis.—Calculated (percent): C, 82.03; H, 11.95; N, 2.81. Found (percent): C, 81.92; H, 12.13; N, 2.74.

Example 14

To a solution of 14 g. of linoleic acid and 5.1 g. of triethylamine in 100 ml. of toluene, is added 5.6 g. of ethyl chloroformate dropwise stirring at −7° C. After completion of the addition, the stirring is further continued at −7° C. for 30 minutes. A solution of 17.2 g. of α-heptadecylbenzylamine in 50 ml. of toluene is added dropwise to the mixture at −5° to −7° C. After stirring at said temperature for 20 minutes, the mixture is allowed to stand overnight at room temperature. Subsequently, the reaction mixture is washed with dilute hydrochloric acid, water, an aqueous sodium carbonate solution and water and then concentrated, whereby 20.9 g. of crystals are obtained, yield to 69%. The crystals are recrystallized from 95% ethanol to obtain the desired linolecyl-α-heptadecylbenzylamide, M.P. 49–50° C.

Elementary analysis.—Calculated (percent): C, 82.96; H, 12.10; N, 2.30. Found (percent): C, 82.65; H, 12.27; N, 2.41.

Example 15

To a solution of 2.2 g. of triethylamine and 4.7 g. of α-nonanylbenzylamine in 150 ml. of ether is added 7 g. of linoleic acid chloride dropwise under stirring at 20°–250° C. The mixture was stirred at room temperature for 4 hours and allowed to stand overnight, and then refluxed and stirred for 2 hours. After cooling, the reaction mixture was washed at a low temperature with dilute hydrochlic acid, water, an aqueous sodium carbonate solution and water and then dried over Glauber's salt. Thereafter, the solvent is completely removed by distillation to obtain 11.1 g. (yield 99%) the desired linolenoyl-α-nonylbenzylamide, $N_D^{22}$ 1.4936.

Elementary analysis.—Calculated (percent): C, 82.36; H, 11.59; N, 2.83. Found (percent): C, 82.11; H, 11.70; N, 2.52.

Example 16

A mixture of 2.2 g. of γ-linolenic acid and 2.0 g. of α-pentylbenzylamine is heated under stirring at 160° C. for 50 hours, removing water from the reaction system. After completion of the reaction, the reaction mixture is distilled to obtain 2.9 of the desired γ-linolenoyl-α-pentylbenzylamide, B.P. 200–208° C./0.8 mm. Hg.

Elementary analysis.—Calculated (percent): C, 82.32; H, 10.82; N, 3.20. Found (percent): C, 82.11; H, 11.02; N, 3.18.

Example 17

A mixture of 5 g. of N-(α-pentadecylbenzyl)-linoleamide and 95 g. of a lard is mixed at 50° C. to prepare an enriched lard.

We claim:

1. Fatty acid amides represented by the formula,

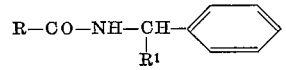

wherein R is a saturated or unsaturated straight chain aliphatic hydrocarbon group having 15 to 19 carbon atoms and $R^1$ is an alkyl group having 5 to 17 carbon atoms.

2. N-(α-nonylbenzyl)-linoleamide.
3. N-(α-pentylbenzyl)-isostearamide.
4. N-(α-pentadecylbenzyl)-linolenamide.
5. N-(α-decylbenzyl)-archidonamide.
6. N-(α-pentylbenzyl)-linoleamide.
7. N-(α-heptylbenzyl)-linolenamide.
8. N-(α-pentadecylbenzyl)-linoleamide.
9. N-(α-pentylbenzyl)-oleamide.
10. N-(α-nonylbenzyl)-oleamide.
11. N-(α-heptadecylbenzyl)-linoleamide.
12. N-(α-nonylbenzyl)-linoleamide.
13. N-(α-pentylbenzyl)-γ-linolenamide.
14. α-Tridecylbenzylamide of safflower oil fatty acid.
15. α-Heptadecylbenzylamide of linseed oil fatty acid.

References Cited

FOREIGN PATENTS

| 1,051,286 | 12/1966 | Great Britain | 260—404 |
| 1,057,742 | 2/1967 | Great Britain | 260—404 |
| 1,074,693 | 7/1967 | Great Britain | 260—404 |
| 1,123,004 | 8/1968 | Great Britain | 260—404 |

OTHER REFERENCES

Niyogy, "The Anuticholesteral Activity of Safflower Oil" (1966), CA65, p. 9568 (1966).

Hanotier, "Clathration of Aromatic Cmpds. etc." (1965), CA64, pp. 4973–74 (1966).

Neth Appl. "Enrichment of Foods etc."; (1966), CA66, p. 45620f. (1967).

Zilletti, "Effect of β-Sitostrol on etc."; (1966), CA66, p. 27115r. (1967).

LEWIS GOTTS, Primary Examiner

G. HOLLRAH, Assistant Examiner

U.S. Cl. X.R.

99—54, 83, 107, 115, 118, 134; 424—324

UNITED STATES PATENT OFFICE
CERTIFICATE OF CORRECTION

Patent No. 3,590,057     Dated June 29, 1971

Inventor(s) Yoshio SUZUKI et al

It is certified that error appears in the above-identified patent and that said Letters Patent are hereby corrected as shown below:

The Serial No. of this U.S. Patent should read --780,876-- and not "7880876".

Signed and sealed this 25th day of January 1972.

(SEAL)
Attest:

EDWARD M. FLETCHER, JR.     ROBERT GOTTSCHALK
Attesting Officer            Commissioner of Patents